(12) United States Patent
Bertolotti

(10) Patent No.: US 8,246,302 B2
(45) Date of Patent: Aug. 21, 2012

(54) TEETER-RESTRAINT DEVICE FOR WIND TURBINES

(75) Inventor: Fabio P. Bertolotti, South Windsor, CT (US)

(73) Assignee: Hamilton Sundstrand Corporation, Rockford, IL (US)

( * ) Notice: Subject to any disclaimer, the term of this patent is extended or adjusted under 35 U.S.C. 154(b) by 1384 days.

(21) Appl. No.: 11/899,422

(22) Filed: Sep. 6, 2007

(65) Prior Publication Data

US 2009/0068012 A1    Mar. 12, 2009

(51) Int. Cl.
*F03D 7/04*     (2006.01)

(52) U.S. Cl. .......... 416/1; 416/14; 416/41; 416/140; 416/148

(58) Field of Classification Search .......... 416/14, 416/27, 41, 102, 133, 140, 148, 156, 1; 92/85 B; 91/400
See application file for complete search history.

(56) References Cited

U.S. PATENT DOCUMENTS

| | | | |
|---|---|---|---|
| 1,214,719 A * | 2/1917 | Slattery | 188/288 |
| 1,567,515 A * | 12/1925 | Kijima et al. | 188/288 |
| 2,360,792 A | 10/1944 | Putnam | |
| 2,454,058 A | 11/1948 | Hayes | |
| 2,875,861 A * | 3/1959 | Lucien | 188/316 |
| 3,814,537 A | 6/1974 | Stoltman | |
| 4,043,254 A | 8/1977 | Jaeger | |
| 4,298,101 A * | 11/1981 | Dressell et al. | 188/285 |
| 4,348,155 A | 9/1982 | Barnes et al. | |
| 4,352,629 A | 10/1982 | Cheney, Jr. | |
| 4,378,198 A | 3/1983 | Pettersson | |
| 4,819,770 A * | 4/1989 | Hahn | 188/284 |
| 5,354,175 A * | 10/1994 | Coleman et al. | 416/9 |
| 5,584,655 A * | 12/1996 | Deering | 416/31 |
| 5,660,527 A * | 8/1997 | Deering et al. | 416/205 |
| 6,776,269 B1 * | 8/2004 | Schel | 188/287 |
| 6,940,186 B2 | 9/2005 | Weitkamp | |
| 2004/0076518 A1 | 4/2004 | Drake | |

FOREIGN PATENT DOCUMENTS

BE    489 121 A    6/1949

OTHER PUBLICATIONS

Extended European Search Report from European Patent Application No. 08251253.4.

* cited by examiner

*Primary Examiner* — Edward Look
*Assistant Examiner* — Aaron R Eastman
(74) *Attorney, Agent, or Firm* — Kinney & Lange, P.A.

(57) ABSTRACT

A wind turbine system includes a shaft, a rotor for driving the shaft, and a first fluidic teeter control assembly. The rotor includes a first blade engaged to the shaft by a hub, and has a degree of freedom to pivot relative to the shaft. A first teeter angle is defined between an instantaneous position of the first blade and a time-averaged plane of rotation of the first blade. The first fluidic teeter control assembly is engaged between the rotor and the shaft for providing a first dynamic teeter restraining force as a function of the first teeter angle and a fluidic resistance. The first dynamic restraining force is relatively low when the first teeter angle is within a first teeter operation range, and the first dynamic restraining force is higher when the first teeter angle is outside that range.

13 Claims, 7 Drawing Sheets

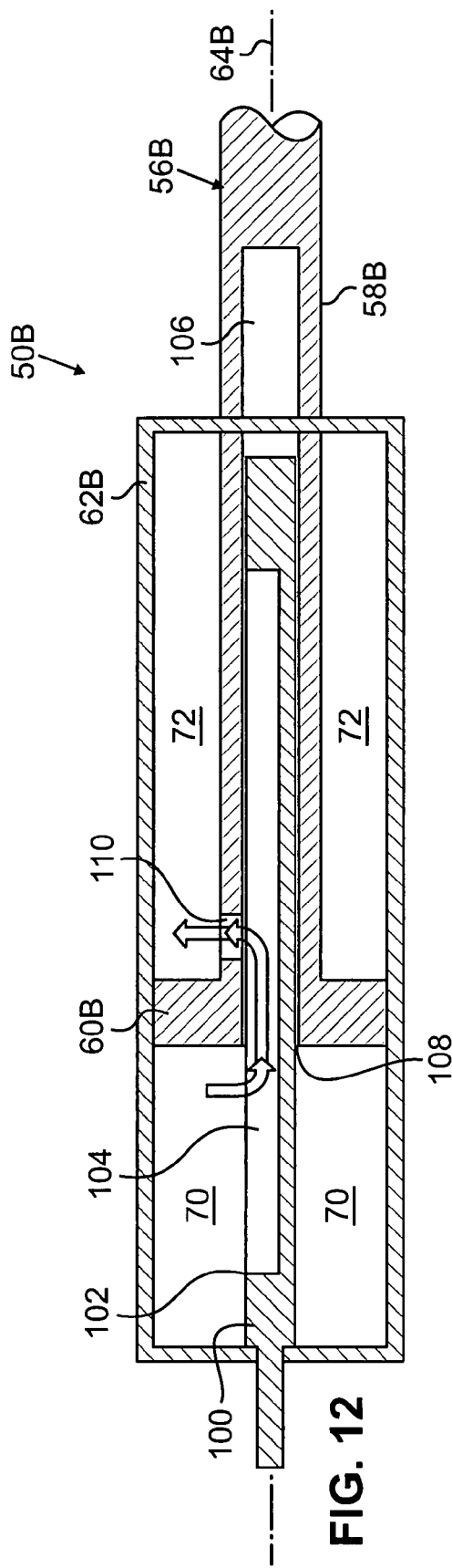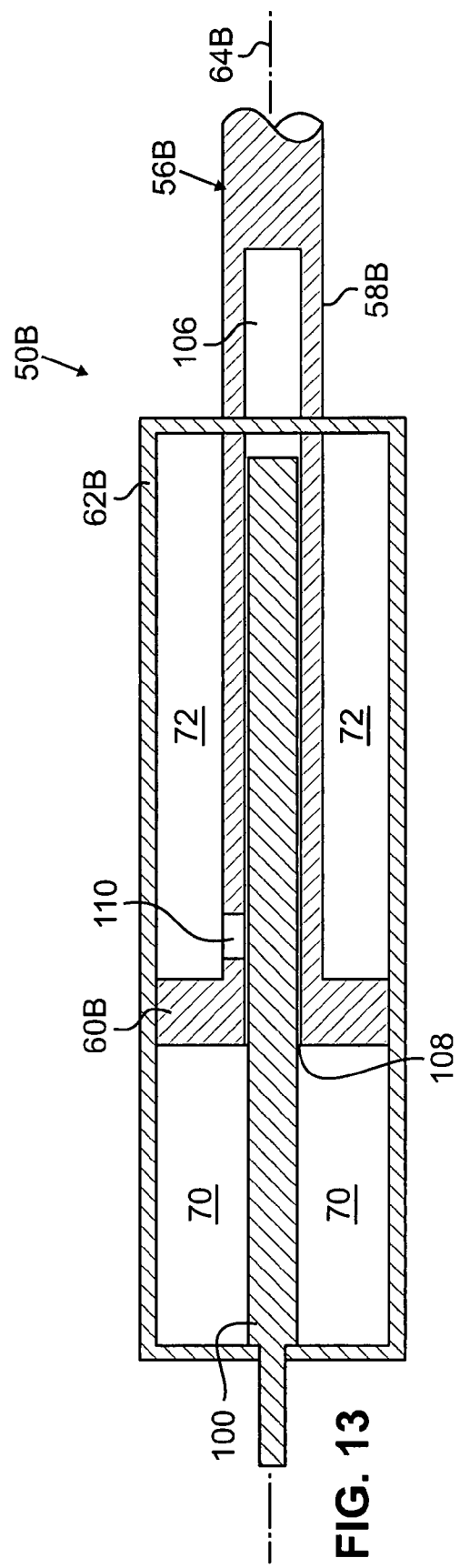

TEETER-RESTRAINT DEVICE FOR WIND TURBINES

BACKGROUND

The present invention relates to wind turbines, and more particularly to teeter control systems for wind turbines.

Wind turbines for converting wind energy to electrical energy typically comprise a rotor with one or more blades and a hub. The rotor is attached to, and supported by, a main shaft receiving the rotational power from the rotor and transmitting this power to a generator. The most popular type of large-scale (e.g., multi-megawatt) wind turbines orient the main shaft in a horizontal direction, thereby making the rotational plane of the rotor lie in essentially a vertical direction.

Most contemporary horizontal axis wind turbines use a three-bladed rotor, and fixedly attach the rotor to the main shaft. Accordingly, bending loads on the blades (i.e., loads in a direction substantially perpendicular to a plane of rotation of the rotor) are transmitted to the main shaft. These bending loads originate from uneven wind distribution over the swept area of the rotor, and due to gyroscopic forces associated with the mass of the rotor when the rotor and a nacelle are yawed away from the wind direction. The shaft and supporting structure is, thereby, built according to the weight and strength required to support these loads.

Since the early 1930's, some large-scale wind turbines have employed rotors with one or two blades, with the distinction that the rotor is attached to the shaft through a pin, called a teeter pin, which allows the rotor to move perpendicular to a time-averaged rotational plane of the rotor, thereby eliminating the transmission of bending loads to the main shaft (when the teetering motion is unconstrained).

An angle between the rotor blades at a given moment and the time-averaged plane of rotation (essentially a vertical plane) is called the teeter angle ($\beta$). During normal operation, teeter-angle variation is desirable: the teeter angle $\beta$ varies within a certain range which can be denoted as a standard operating range, and, within that range, changes in response to wind-shear (which produces unequal wind velocity over the rotor swept area) and turbulence, and in response to gyroscopic forces produced by yawing the rotor into and away from a current wind direction. Due to a lag between load and displacement, maximum teeter-angle values for a two-bladed rotor typically occur when a rotor azimuthal position is essentially horizontal (i.e., parallel to the ground). At and around this horizontal rotor azimuthal position, there is no chance of collision between a blade and the tower (i.e., a blade-tower strike). Only when the rotor is in a vertical azimuthal position, does a blade pass in the vicinity of the tower. Consequently, the acceptable range of teeter-angle excursions depends on the azimuthal position of the rotor.

Teetering motion of the rotor reduces bending forces on the rotor that would otherwise be present and would cause fatigue in the blades, hub, and main shaft. There are two limits imposed on the teeter angle. The first limit is imposed by the mechanical structures at the rotor to main-shaft junction. The other, more constraining limit is due to blade-tower collisions. That is, if the teeter angle $\beta$ increases past a certain value as a blade is passing near the wind-turbine support tower, there is risk of catastrophic blade-tower collision. To avoid this type of event, most turbines with teetering rotors include a teeter-restraint mechanism that prevents unwanted excursions of the teeter angle.

Two types of teeter restraint mechanisms are found in the prior art. One, which is called the contact type, consists of some flexible material, such as an elastomer or a metal spring, that becomes compressed once the rotor teeter angle exceeds a predetermined amount and contact between the rotor and the teeter restraint mechanism occurs. The restoring force imparted by this type of contact restraint mechanism onto the rotor is quite large, and "impulsive" in nature. These restraining loads are undesirable because they promote fatigue and catastrophic damage, thereby necessitating increased strength and weight in the rotor and nacelle structure. Furthermore, this type of restraint mechanism is independent from the rotor azimuthal position, therefore it provides unnecessary and damaging restraining force irrespective of rotor azimuthal position, and hence generates restraining forces even in the absence of any risk of blade-tower strike.

The other type of known teeter restraint mechanism uses a hydraulic cylinder, regulated by a control system, to provide a non-impulsive force restraining teeter motion. With this type of mechanism, teetering motion moves the piston within the cylinder, thereby displacing hydraulic fluid into a circuit external to the cylinder. The circuit connects at least two cylinders, so that the fluid ejected by one cylinder is accepted into the other. Restriction of teeter motion is generated by making the hydraulic fluid pass through a constriction, or orifice, located in this circuit. Because the pressure loss across the orifice increases with flow rate, this mechanism provides a teeter-restraint force that is proportional to, and only to, the teeter angular velocity, rather than to the teeter angle itself. This behavior is undesired, because most often, maximal angular velocity occurs as the rotor crosses a teeter angle $\beta$ of zero degrees. Therefore, this second type of teeter restraint mechanism places a large, often maximal, restraining force on the rotor when the rotor is at zero teeter angle $\beta$, well within the standard operating range, and precisely when the possibility of tower strike is minimal. This restraining force is cyclic (occurring at every rotor revolution) and produces an unnecessary and damaging (e.g., fatigue-inducing) load on the rotor and the main shaft. Furthermore, large and beneficial teeter angular velocities also occur during nacelle-yaw maneuvers, wherein the unconstrained teeter-angle variation prevents large gyroscopic forces from reaching the main shaft. The second type of mechanism device resists, and fights against these rapid and beneficial teetering motions. In summary, the second type of mechanism imposes a restraining force on the rotor in conditions when free teeter motion is desired, including teeter angles inside the standard operating range, and teeter-angle excursions during yaw maneuvers, thereby reducing, if not eliminating, the fundamental benefits of the teetering rotor design.

In addition, known teeter restraint mechanisms lack means to prevent any teetering motion at desired times. For example, prior art teeter restraint mechanisms do not allow teetering motion to be blocked during start-up and during parked conditions when the rotor is not rotating.

SUMMARY

A wind turbine system includes a shaft, a rotor for driving the shaft, and a first fluidic teeter control assembly. The rotor includes a first blade engaged to the shaft by a hub, and has a degree of freedom to pivot relative to the shaft. A first teeter angle is defined between an instantaneous position of the first blade and a time-averaged plane of rotation of the first blade. The first fluidic teeter control assembly is engaged between the rotor and the shaft for providing a first dynamic teeter restraining force as a function of the first teeter angle and a fluidic resistance. The first dynamic restraining force is relatively low when the first teeter angle is within a first teeter operation range, and the first dynamic restraining force is higher when the first teeter angle is outside that range.

BRIEF DESCRIPTION OF THE DRAWINGS

FIG. 12 is a cross-sectional view of the teeter control assembly of FIG. 11 in an engaged position that permits teetering motion.

FIG. 13 is a cross-sectional view of the teeter control assembly of FIGS. 11 and 12 in a disengaged position that blocks teetering motion.

DETAILED DESCRIPTION

In general, the present invention provides a fluidic teeter control system for a wind turbine that provides a dynamic teeter restraint force that varies as a function of teeter angle. This allows relatively low magnitude teeter restraint forces to be provided within a first range of teeter angles, and larger magnitude teeter restraint forces to be provided outside that first range of teeter angles. This variation of magnitude of the teeter restraint force as a function of teeter angle can be implemented in different ways, such as with varying-depth grooves on an inner diameter wall of a hydraulic piston cylinder, or with a hollow rod that can selectively create a fluid passage across a hydraulic piston in a cylinder. Such teeter restraint forces can be provided passively, which permits embodiments that lessen wear, fatigue and maintenance concerns. Optionally, an external fluid circuit with a variable resistance valve can be provided to actively control teeter resistance force as a function of a signal from an azimuthal position sensor, in order to further help reduce a risk of blade-tower strikes. These and other features of various embodiments of the present invention are explained in greater detail below.

Figure 1:
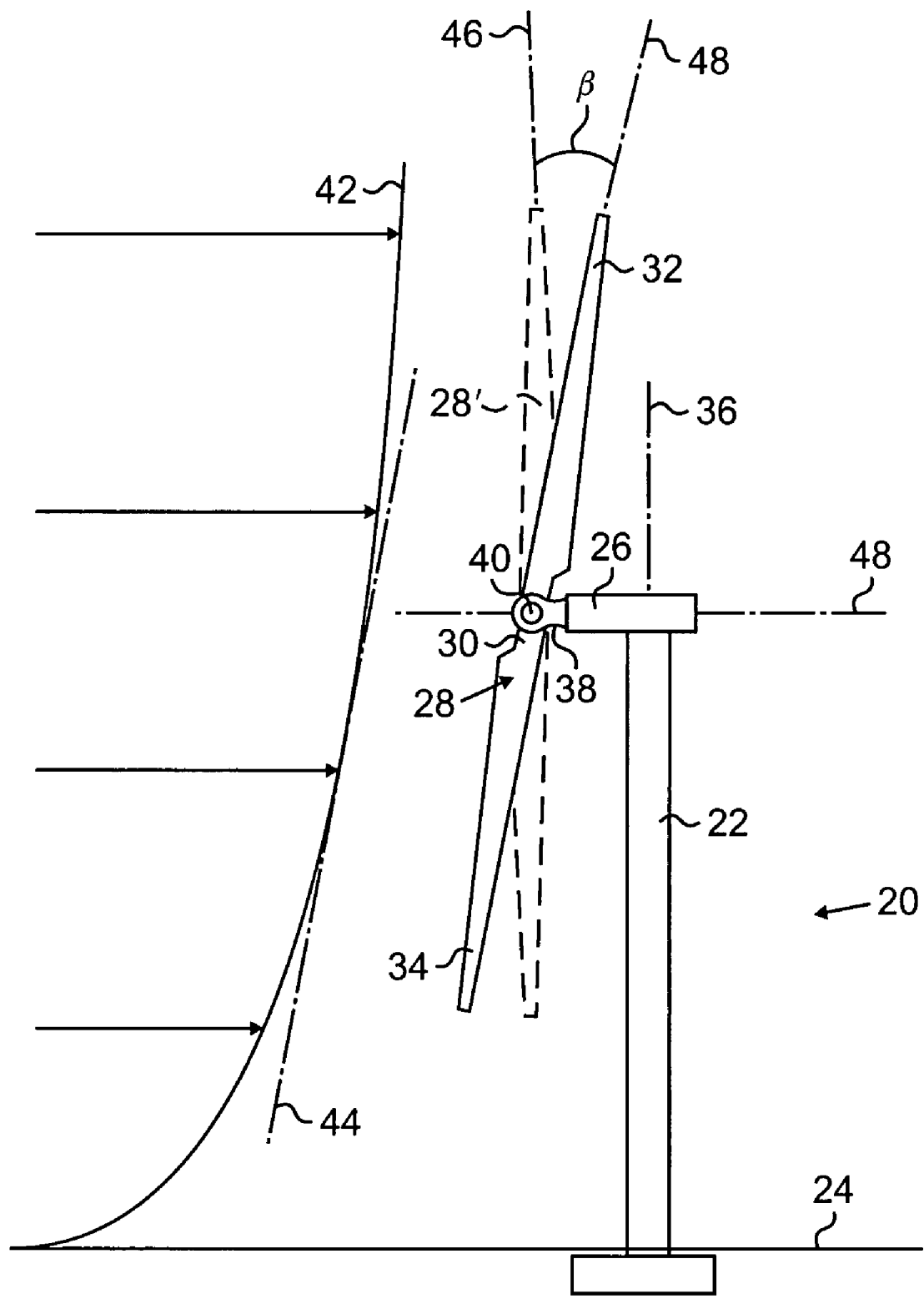
FIG. 1 is an elevation view of a wind turbine system according to the present invention.
Figure 2:
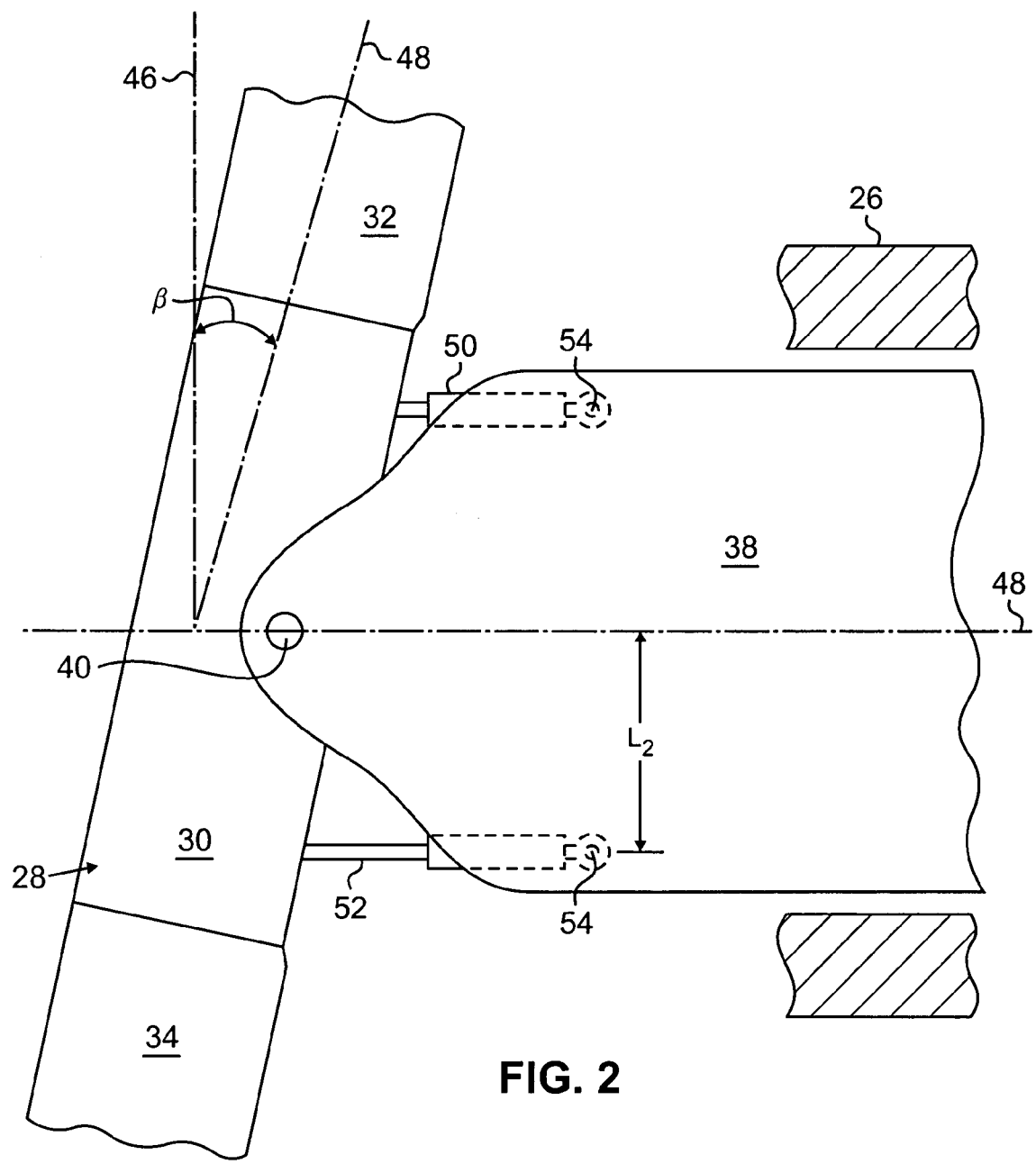
FIG. 2 is a partial cross-sectional view of a portion of the wind turbine system.

FIG. 1 is an elevation view of a horizontal axis wind turbine system 20 that includes a support tower 22 extending vertically from a footing on the ground 24, a nacelle 26, and a rotor 28. FIG. 2 is a partial cross-sectional view of a portion of the wind turbine system. In the illustrated embodiment shown in FIGS. 1 and 2, the rotor 28 is a two-blade type with a hub 30 and first and second blades 32 and 34 extending from the hub 30. The nacelle 26 (a portion of which is shown in cross-section in FIG. 2) is supported by the support tower 22, and can move about a yaw axis 36. The rotor 28 is attached to a main shaft 38 by a teeter pin 40, and the main shaft 38 is in turn supported by the nacelle 26. In the illustrated embodiment, the main shaft 38 is hollow, although other types of shafts can be used in alternative embodiments. A generator (not shown) can be operably connected to the main shaft 38 for generating electrical energy. FIG. 1 also shows exemplary atmospheric conditions, including an atmospheric boundary layer 42 and a wind shear gradient 44.

As the rotor 28 rotates, a time-averaged rotational plane 46 (essentially a vertical plane) is defined by the sweep of the rotor 28 about an axis of rotation 48. The orientation of the rotor 28 in the time-averaged rotational plane 46 is shown in FIG. 1 in phantom as rotor 28'. The teeter pin 40 allows the rotor 28 to move relative to the time-averaged rotational plane 46. At any given moment, a teeter angle β is defined between the blades 32 and 34 of the rotor 28 and the time-averaged rotational plane 46. The teeter angle β can vary within a maximum teeter range (i.e., the allowed teeter angle excursion that can be accommodated by the rotor-to-main-shaft structure), for example plus or minus 8° with respect to the time-averaged rotational plane 46, but typically varies within a range denoted as a standard operating range, for example, plus or minus 3° with respect to the time-averaged rotational plane 46. Changes in the teeter angle β can occur in response to turbulence, wind-shear 44 (which produces unequal wind velocity over a rotor-swept area), and gyroscopic forces produced by yawing the rotor 28 and nacelle 26 about the yaw axis 36 into and away from a current wind direction. During normal operation, variation of the teeter angle β is desirable, reducing the transmission of bending loads to the main shaft 38 (when the teetering motion is unconstrained).

In order to control teetering motion of the rotor 28, one or more teeter control assemblies are provided. In the embodiment illustrated in FIGS. 1 and 2, a first teeter control assembly 50 and a second teeter control assembly 52 are connected between the rotor 28 and the main shaft 38. Each teeter control assembly 50 and 52 structurally joints at least one blade 32 or 34 or hub 30 to a point fixed relative to the main shaft 38. As shown in FIG. 2 with respect to the second teeter control assembly 52, each teeter control assembly 50 and 52 is connected to the shaft 38 with a teeter restraint pin 54 located at a distance $L_2$ from the axis of rotation 48 of the shaft 38. In the illustrated embodiment, the teeter control assemblies 50 and 52 are connected to an internal cavity of the shaft 38.

Figure 3:
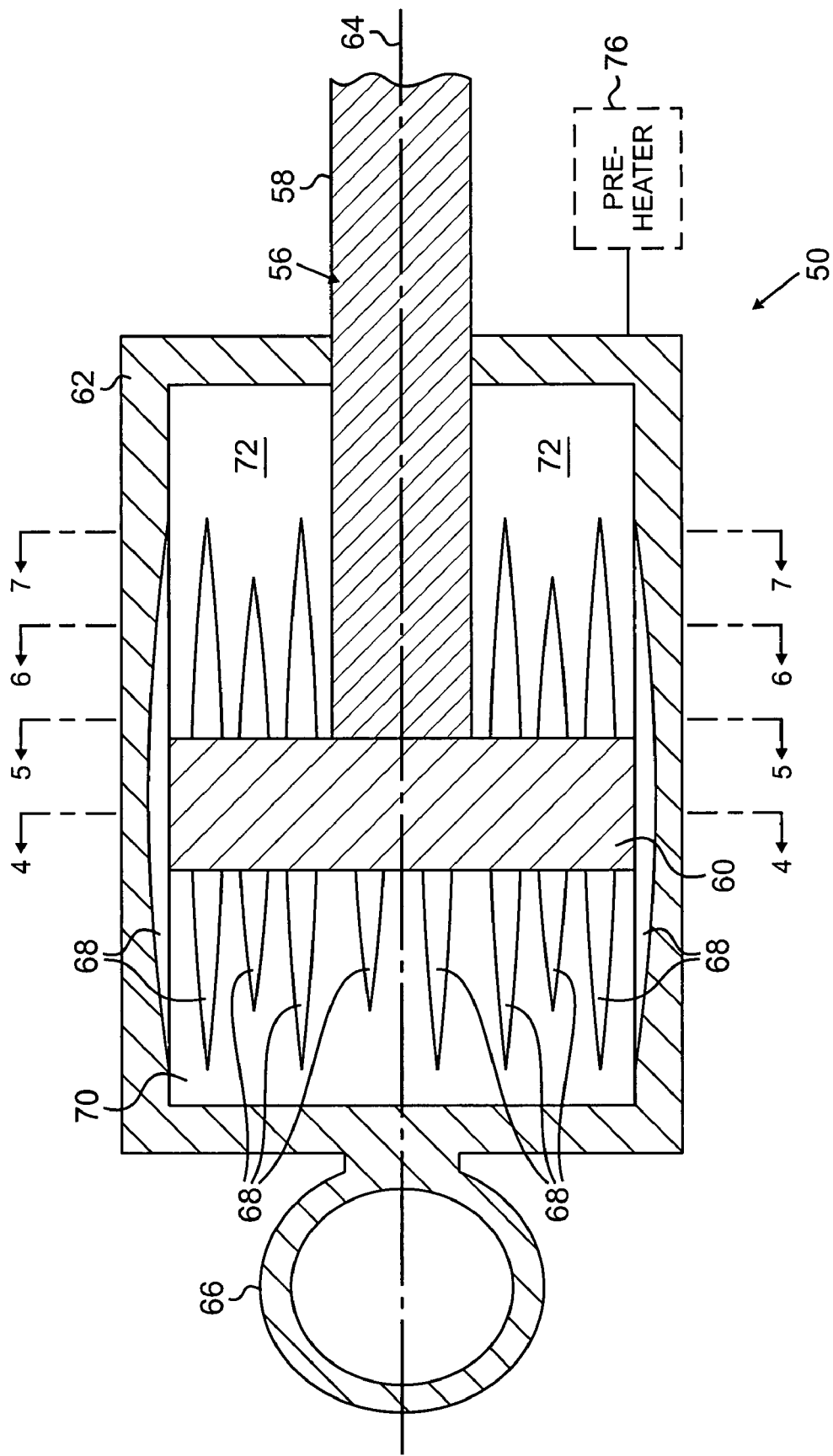
FIG. 3 is a cross-sectional view of a first embodiment of a teeter control assembly.

FIG. 3 is a cross-sectional view of a first embodiment of the first teeter control assembly 50. The second teeter control assembly 52 can have a similar configuration, and all descriptions of the first teeter control assembly 50 can apply to the second teeter control assembly 52. The first teeter control assembly 50 includes a piston 56 having a piston shaft 58 and a piston head 60 movable inside a closed tube 62 (e.g., a cylinder) along a piston axis 64. A working fluid, preferably an essentially incompressible fluid such as conventional hydraulic fluid, is located inside the tube 62. Seals, not shown in the figure, can be used to prevent undesired leakage of the working fluid. A pin (not shown) can connect the piston shaft 58 to a selected point on the rotor 28, such as point on the hub 30 that avoids point-loads on the adjacent blade 32. The tube 62 is structurally attached to the nacelle 26, relative to the main shaft 38, so that the entire teeter control assembly 50 rotates with the rotor 28. The attachment of the tube 62 to the main shaft is through the teeter restraint pin 54 connected to a mounting structure extending from the tube 62, whereby forces are transmitted between the tube 62 and the main shaft 38 while still allowing rotational motions (i.e., pivotal motions) of the tube 62 with respect to the shaft 38 and nacelle 26. These rotational motions are kinematical in nature and arise due to the separate location in space (i.e., distance $L_2$) between the teeter pin 40 and the teeter restraint pin 54 (see FIG. 2).

A change in the teeter angle β of the rotor 28 will cause the piston 56 to move along the piston axis 64. Inner diameter walls of the tube 62 contain a number of grooves 68 that allow the passage of working fluid (axially with respect to the piston axis 64) allowing passage of working fluid between a first volume 70 in front of the piston head 60 and a second volume 72 behind the piston, that is, from one side of the piston head 60 to the other. The number of grooves can vary as desired for particular applications. In one embodiment, the grooves 68 are aligned essentially parallel to the piston axis 64. Typically the grooves 68 are substantially equally spaced from each other. The grooves 68 change depth (i.e., radial depth with respect to the piston axis 64) as function of axial location. In particular, the grooves 68 can be deepest near a axial midpoint of the tube 62, and shallowest at the axial extremities of the tube 62. The grooves 68 can all extend substantially an entire interior axial length of the tube 62. In one embodiment, different grooves 68 can have different axial lengths.

Figure 4:
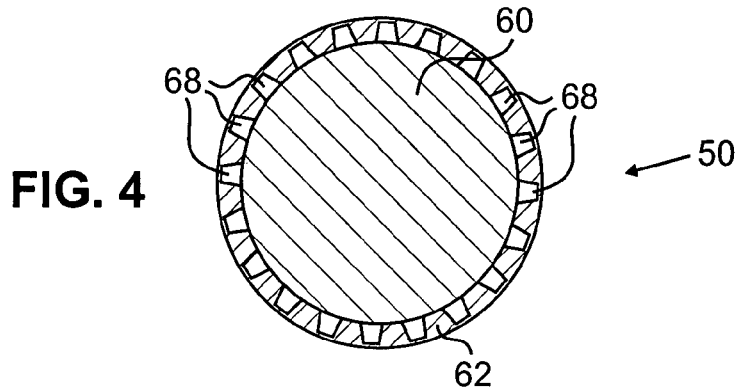
FIGS. 4-7 are cross-sectional views of the first embodiment of the teeter control assembly, taken along lines 4-4, 5-5, 6-6 and 7-7, respectively, of FIG. 3.
Figure 5:
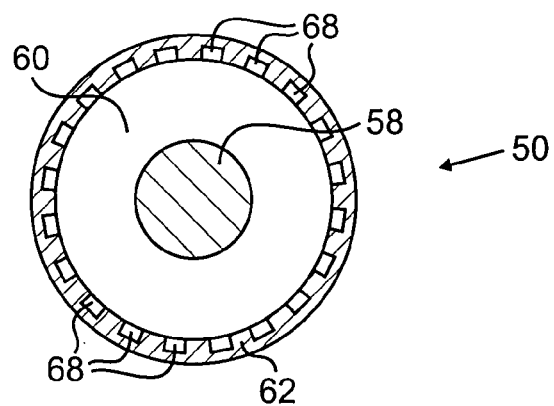
Figure 6:
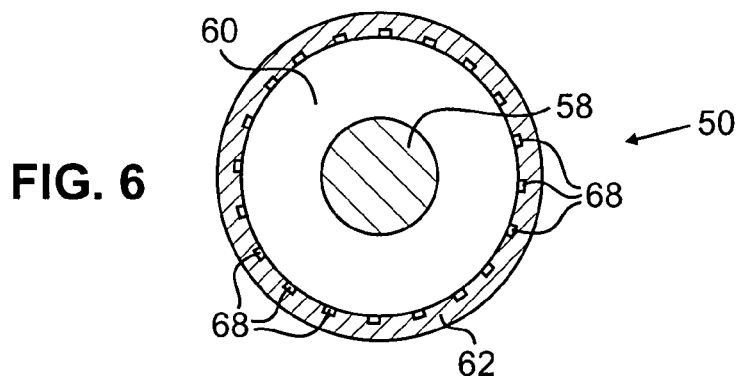
Figure 7:
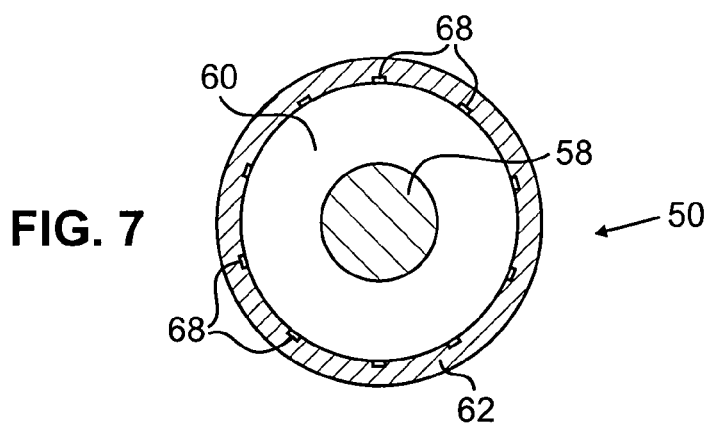

FIGS. 4-7 are cross-sectional views of the teeter control assembly 50, taken along lines 4-4, 5-5, 6-6 and 7-7, respectively, of FIG. 3. The variation in depth of the grooves 68 is visible in the sequence of cross-sections shown in FIGS. 4-7 (not all of the grooves 68 are numbered in FIGS. 4-7). The cross-section of FIG. 4 is taken at approximately the axial midpoint of the tube 62, where the grooves 68 are relatively deep (radially). The cross-sections of FIGS. 5-7 show the radial depth of the grooves 68 becoming progressively lesser toward one end of the tube 62, as well as the axial length of the grooves 68 varying to lessen the total cross-sectional area toward the one end of the tube 62.

Figure 8:
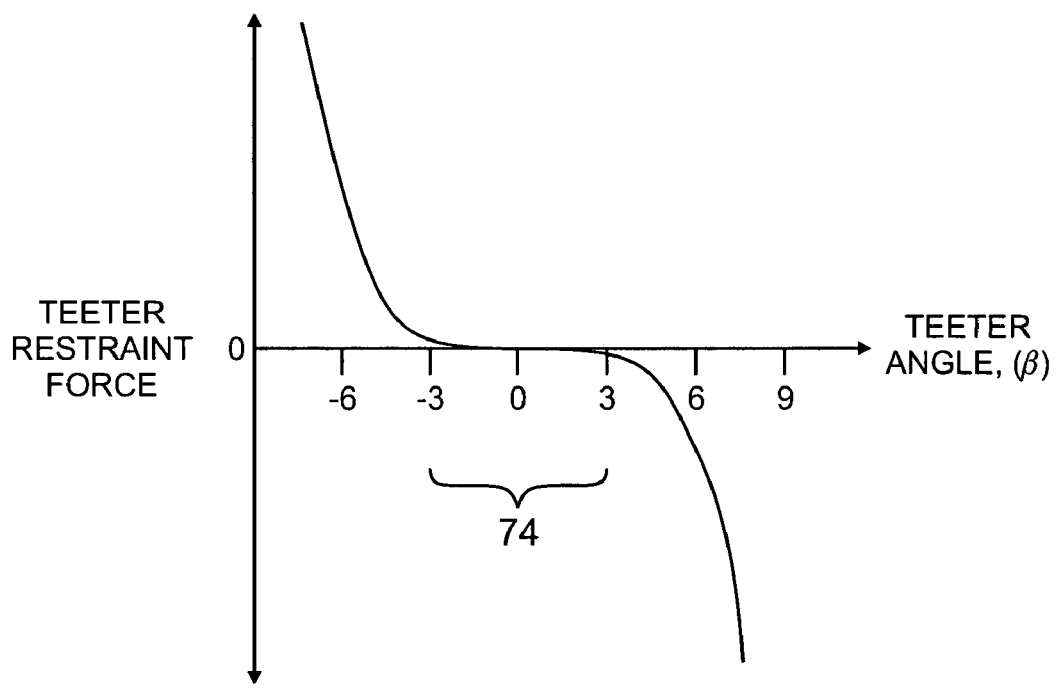
FIG. 8 is a graph of teeter restraint force versus teeter angle β for the first embodiment of the teeter control assembly.

FIG. 8 is an exemplary graph of teeter restraint force experienced by the piston 56 versus teeter angle β of the rotor 28. The teeter restraint force (or restraining force) is the force (impulse) provided by the teeter control system 50 along the piston axis 64 that tends to oppose teetering motion of the rotor 30. When the rotor operates within the standard operating range 74, it is most desired to allow the rotor 28 to undergo "free-teetering", that is, teetering that is substantially unconstrained by teeter restraining forces from the teeter control assembly 50. Accordingly, as shown in FIG. 8, restraining force varies progressively or non-linearly as a function of the teeter angle β. In the illustrated embodiment, the teeter restraint force is relatively low (near zero) and constant within a standard operating range 74, that is, a normal range of teeter motion arising in normal operation of the wind-turbine system 20. Outside of the standard operating range 74, the teeter restraining force increases quickly, and approaches relative maximum values at the greatest teeter angles β within the maximum teeter range.

For instance, when the piston head 60 is located near the axial midpoint of the tube 62, an axial displacement of the piston 56, caused by a change in teeter angle β, will cause working fluid to pass through the grooves 68 from the first volume 70 on one side of the piston head 60 to the second volume 72 on the other side of the piston head 60, or vice-versa. Because the grooves 68 are relatively deep at this central axial location, resistance encountered by working fluid passing through the grooves 68 is small, thereby creating only minimal restraining force on the piston 56 and allowing essentially free-teeter operation within the standard operating range 74.

As the teeter angle β of the rotor 28 exceeds the standard operating range 74, the restraint forces raise smoothly and monotonically with teeter-angle β. The teeter control assembly 50 thus allows essentially unconstrained, free-teeter motion when the teeter angle β is within the standard operating range 74, and provides a smoothly increasing restraining force at increasing teeter angles β outside the standard operating range 74. When the piston head 60 is located near the axial extremities of the tube 62, the relatively shallow depth of the grooves 68 creates a relatively large resistance to the passage of working fluid therethrough, thereby creating a pressure differential across the piston head 60, and, hence, a relatively large restraining force.

The particular relationship between teeter restraint force and teeter angle β can vary as desired for particular application. For instance, the configuration of the grooves 68 influences the relationship between teeter restraint force and teeter angle β. However, a suitable relationship can generally be established as follows. Integrating the area under a curve plotted on a graph of teeter restraint force versus teeter angle β (e.g., the curve shown in the graph of FIG. 8) will obtain a total force value that can be multiplied by the time over which the restraint force is applied to obtain a value of the impulse provided by the teeter restraint assembly 50. The value of the impulse provided by the teeter restraint assembly 50 should be sufficient to stop teetering motion of the rotor 28, which will depend upon the mass and teetering velocity of the rotor 28. Expected teetering velocities of the rotor 28 (experimentally known or determined) can be used along with a known or measured mass of the rotor 28 to anticipate suitable relationships between teeter restraint force and teeter angle β for particular applications.

It is well known in the art that the pressure-loss of fluid (e.g., the working fluid) through an orifice depends both on the orifice size, as discussed above in relation to the depth of the grooves 68, and to fluid velocity. It follows, then, that restraining force provided by the teeter control assembly 50 increases with teeter angular velocity, once the teeter-angle exceeds the standard operating range 74. This velocity dependence is desirable, because high teeter angular velocities at high teeter-angles β would otherwise increase the likelihood of a collision between one of the blades 32 and 34 and the support tower 22 (i.e., a blade-tower strike).

All teetering motion, including that in the standard operating range 74, produces working fluid flow within the teeter control assembly 50. This flow is unavoidably affected by fluid viscosity, hence is unavoidably accompanied by some degree of energy dissipation into heat. Consequently, during operation of the wind turbine system 20, the working fluid will reach a steady temperature above ambient. The working fluid temperature is determined by the ratio of energy dissipation to convective and conductive heat transfer away from the surface of the tube 62 and the piston shaft 58. It should be noted that the teeter control assembly 50 is in rotational motion in unison with the rotor 28, hence the teeter control assembly 50 receives an essentially constant flow of relatively cool atmospheric air that transports heat away from the cylinder through convection. In order to enhance this heat dissipation, cooling fins (not shown) on the exterior of the tube 62 or an external working fluid cooling circuit (not shown) can be employed to help further reduce working fluid temperature.

A thermal condition controller can help regulate working fluid temperature. For instance, for wind turbine operations in extreme cold-weather regions, a working fluid pre-heater 76 (e.g., an electric heater) can be optionally included with the teeter control assembly 50 (see FIG. 3) for use while the wind turbine system 20 is stopped to bring the working fluid to operating temperature (the pre-heater 76 is shown only schematically for simplicity). Once the turbine system 20 commences operation, the energy dissipation in the working fluid essentially can maintain the operating temperature without the need for added heat from the pre-heater 76. Alternatively, or in addition, a fluid cooling apparatus (e.g., a conventional refrigeration unit) could be used like the pre-heater 76 to help control working fluid temperature by actively removing thermal energy from the working fluid as desired.

The most ideal behavior of the wind turbine system 20 is to regulate the teeter restraining force based on both the teeter angle β of the rotor 28, as described above, as well as an azimuthal position of the rotor 28. The azimuthal position is the angular orientation of the rotor about the axis of rotation 48. In particular, the two-bladed rotor 28 at azimuthal angles (θ) near zero and 180° (corresponding to a horizontal orientation of the blades 32 and 34 of the rotor 28) has no chance of blade-tower strike, and the restraining force should be reduced in magnitude with respect to the restraining force produced when the blades 32 and 34 of the rotor 28 are in a vertical position (i.e., azimuthal angles θ of 90° and 270°). Relatively large restraining forces should be generated by the teeter control assembly 50 only when maximum teeter angles β of the maximum teeter range are approached. To accommodate a change in magnitude of restraining force as function of rotor azimuthal position, an alternative embodiment of the present invention includes a means for sensing the azimuthal position of the rotor 28 and a means for adjusting the restraining force resistance in response to the sensed azimuthal angle θ of the rotor 28.

Figure 9:
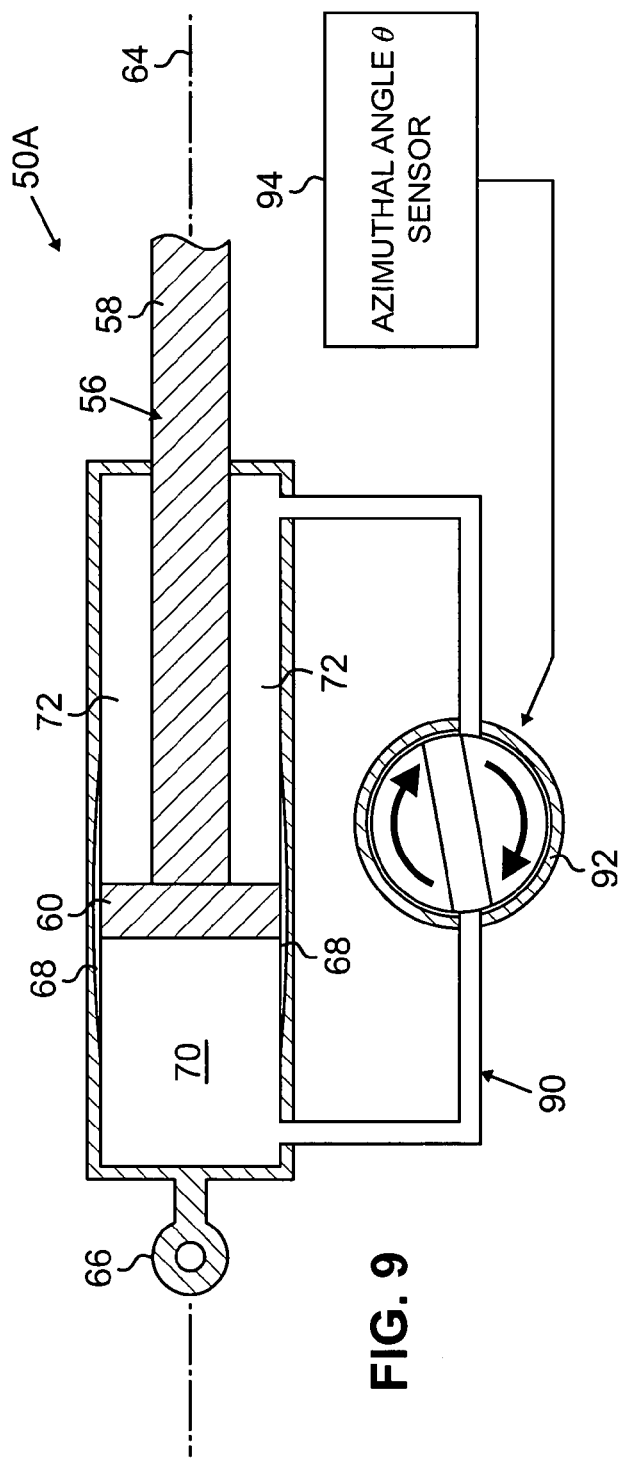
FIG. 9 is a cross-sectional view of another embodiment of a teeter control assembly.

FIG. 9 is a cross-sectional view of an alternative teeter control assembly 50A. The teeter control assembly 50A can be generally similar to the teeter control assembly 50 described above, but further includes an external fluid circuit 90 connecting to the first volume 70 and the second volume at the axial extremities of the tube 62, a variable resistance valve 92 positioned within the external fluid circuit 90, and an azimuthal angle (θ) sensor 94 (shown only schematically for simplicity). The sensor 94 can be an optical sensor or other type of conventional sensor suitable for detecting the azimuthal angle θ of the rotor 28. The sensor 94 is operably generates an output signal, and the valve 92 is controlled as a function of that sensor output signal.

Fluid resistance of the valve 92 can be varied as function of the azimuthal angle θ of the rotor 28 as follows. When the azimuthal angle θ is near 90° and 270°, corresponding to a vertical position of the blades 32 and 34 of the rotor 28, the valve 92 is shut, thereby making the teeter control assembly 50A respond as described above with respect to the teeter control assembly 50. In particular, with the valve 92 shut, the resistance to motion of the piston head 60 comes solely from the passage of working fluid through the grooves 68 (not shown in FIG. 9 for clarity) in the tube 62. When the azimuthal angle θ of the rotor 28 is near zero or 180°, the valve 92 is opened, allowing passage of working fluid from the first volume 70 in front of the piston head 60 to the second volume 72 behind the piston head 60, or vice-versa, and thereby eliminating most of the fluid resistance to motion of the piston 56. In an alternative embodiment of the teeter control assembly 50A, the grooves 68 can be omitted and teeter resistance provided solely by the external fluid circuit 90. In such an alternative embodiment, a teeter angle (β) sensor (not shown) can be used in conjunction with the azimuthal sensor 94.

Figure 10:
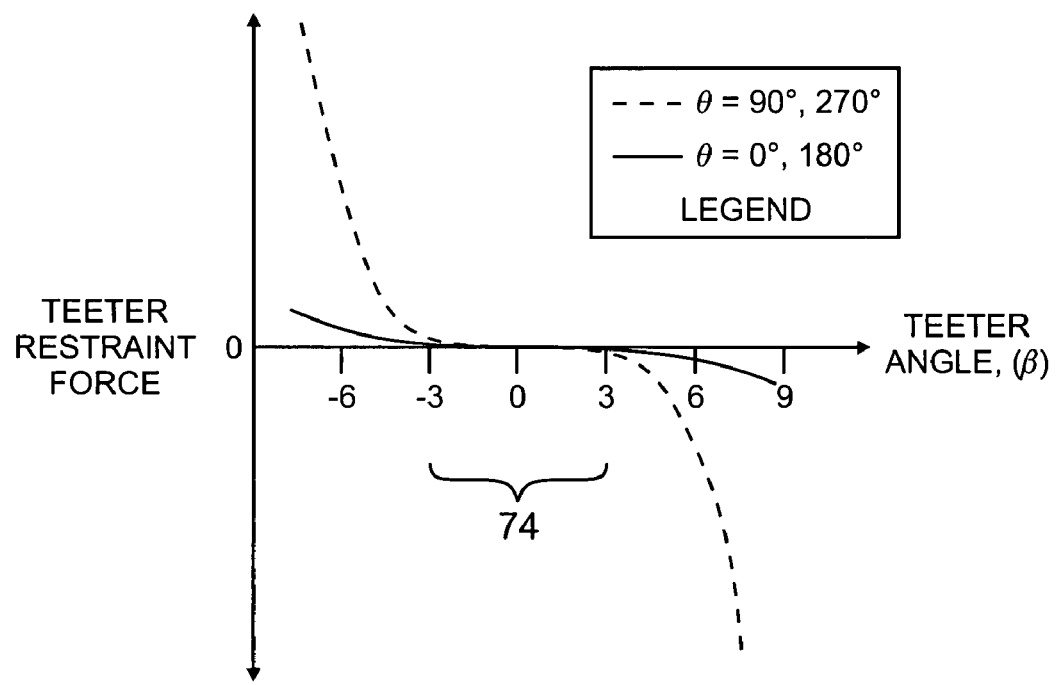
FIG. 10 is a graph of teeter restraint force versus teeter angle β for the embodiment of the teeter control assembly of FIG. 9.

FIG. 10 is a graph of teeter restraint force versus teeter angle β for the embodiment of the teeter control assemblies 50A. As shown in FIG. 10, a solid curve illustrates a relatively low magnitude teeter resistance curve that can correspond to restraint force supplied by the teeter restraint system 50A at azimuthal angles θ of the blades 32 and 34 of the rotor 28 near zero or 180°. A dashed curve illustrates relatively high magnitude teeter resistance curve that can correspond to restraint force supplied by the teeter restraint system 50A at azimuthal angles θ of the blades 32 and 34 of the rotor 28 near 90° and 270°, corresponding to substantially vertical position of the blades 32 and 34 of the rotor 28 where a risk of blade-tower strike is otherwise elevated. As shown in FIG. 10, the teeter restraint force for both the solid and dashed curves is relatively low (near zero) and constant within the standard operating range 74.

Another concern with wind turbine operation is a need to block (i.e., prevent or substantially reduce) teetering motion of the rotor 28 at selected times. For instance, during start-up and parked conditions, it is desired to block teetering motion of the rotor 28.

Figure 11:
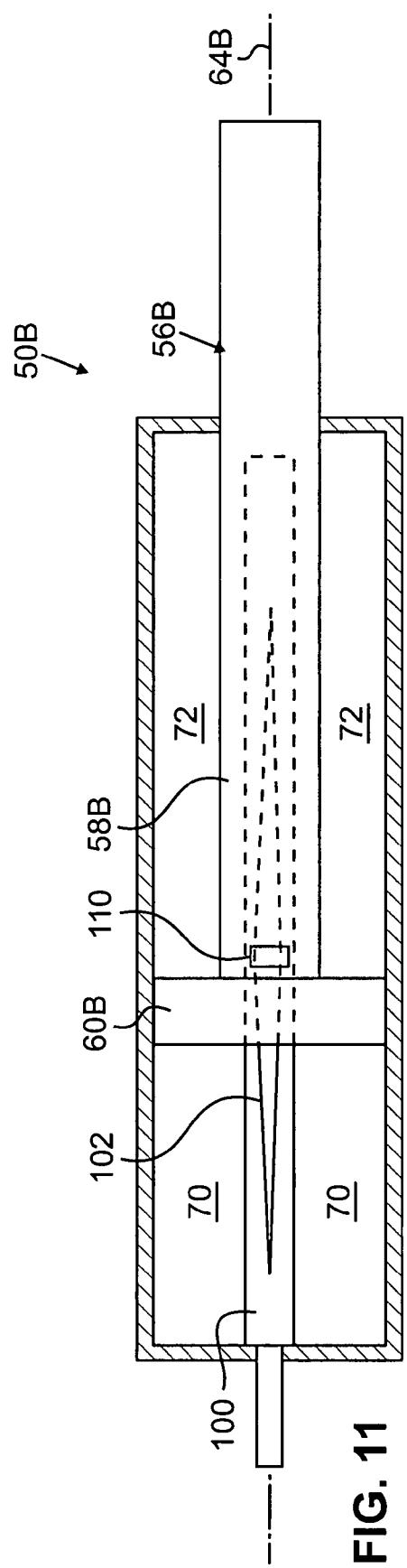
FIG. 11 is a partial cross-sectional view of another embodiment of a teeter control assembly.

FIG. 11 is a partial cross-sectional view of an alternative embodiment of a teeter control assembly 50B that includes piston 56B having a piston shaft 58B and a piston head 60B, a tube 62B, and a rod 100 (only the tube 62B is shown in cross-section in FIG. 11). FIGS. 12 and 13 are full cross-sectional views of the teeter control assembly 50B in two different engagement positions. It should be noted that the tube 62B of teeter control assembly 50B does not include grooves along an inner diameter wall as with the other embodiments previously discussed.

The rod 100 is arranged coaxially with a piston axis 64B, and includes an opening 102 to an internal cavity 104. The rod 100 can rotate about the piston axis 64B, but is fixed relative to the tube 62B to prevent translational movement the axial direction. The opening 102 varies in width along the piston axis 64B. In the illustrated embodiment, the rod 100 is substantially cylindrical in shape, and the opening 102 is rhombic in shape.

The piston shaft 58B has an internal cavity 106 that extends in a generally axial direction, and the piston head 60B has a central opening 108 that adjoins the internal cavity 106. Further, a lateral opening 110 is formed in the piston shaft 58B that is in fluid communication with the internal cavity 106. The lateral opening 110 can have a rectangular shape. As the piston 56B moves within the tube 62B, a portion of the rod 100 can pass through the central opening 108 in the piston head 60B and into the internal cavity 106 in the piston shaft 58B. The piston 56B is rotationally fixed, and can only move linearly along the piston axis 64B with respect to the tube 62B.

The rod 100 can be rotated about the piston axis 64B between an engaged position that permits controlled teetering motion, and a disengaged position that blocks teetering motion. FIG. 12 is a cross-sectional view of the teeter control assembly 50B with the rod 100 rotated to an engaged position that permits controlled teetering motion. In the engaged position, the opening 102 in the rod 100 and the lateral opening 110 in the piston shaft 58B are aligned, and the assembly 50B allows working fluid to flow between the first volume 70 in front of the piston head 60B and the second volume 72 behind the piston head 60B. In particular, working fluid from the first volume 70 can pass through a portion of the opening 102 and into the internal cavity 104 in the rod 100. Working fluid can pass axially through the internal cavity 104, through the opening 108 in the piston head 60B, then back through the opening 102 in the rod and through the lateral opening 110 in the piston shaft 58B to the second volume 72 (an exemplary fluid flow is designated by arrow in FIG. 12). FIG. 13 is a cross-sectional view of the teeter control assembly 50B with the rod 100 rotated to a disengaged position that blocks teetering motion. In the disengaged position, the rod 100 is rotated about the piston axis 64B such that the opening 102 in the rod 100 and the lateral opening 110 in the piston shaft 58B are not aligned. In particular, this essentially prevents working fluid from passing between the first and second volumes 72, which prevents the piston 56B from moving and thus prevents teetering motion.

The width (or circumferential dimension) of the opening 102 in the rod 100 varies along the piston axis 64B, with a maximum width at approximately its midpoint and less widths toward either end, the fluid resistance to working fluid movement can vary depending on the position of the piston 56B. In other words, the teetering restraint force can vary as a function of teeter angle β. The teeter control assembly 50B thus provides an alternative means for varying teeter restraint force as a function of teeter angle β while also providing a way to affirmatively block all teetering motion at selected times.

Furthermore, the rod 100 can be rotated such that some overlap between the opening 102 in the rod 100 and the lateral opening 110 in the piston shaft 58B is provided, but less than full alignment. This also allows fluid resistance to be controlled by rotation of the rod 100 in addition to control due to axial movement of the piston 56B relative to the rod 100.

Although the present invention has been described with reference to preferred embodiments, workers skilled in the art will recognize that changes may be made in form and detail without departing from the spirit and scope of the invention. For instance, features described with respect to one embodiment, such as azimuthal sensors, variable resistance valves and working fluid thermal condition controllers, can be readily adapted to other embodiments of the present invention.

The invention claimed is:

1. A wind turbine system comprising:
a shaft;
a rotor for driving the shaft, the rotor comprising a first blade engaged to the shaft by a hub, wherein the first blade has a degree of freedom to pivot relative to the shaft, and wherein a first teeter angle is defined between an instantaneous position of the first blade and a time-averaged plane of rotation of the first blade; and
a first fluidic teeter control assembly engaged between the rotor and the shaft for providing a first dynamic teeter restraining force as a function of the first teeter angle and a fluidic resistance, wherein the first dynamic restraining force is relatively low when the first teeter angle is within a first teeter operation range, and wherein the first dynamic restraining force varies such that the first dynamic restraining force is higher when the first teeter angle is outside the first teeter operation range, wherein the first fluidic teeter control assembly comprises:
a piston tube that defines an interior surface, wherein the piston tube is connected to the shaft by a pin connection;
a piston movable within the piston tube along a piston axis, wherein the piston is connected to the rotor by a pin connection;
a working fluid, wherein the working fluid is displaced as a function of movement of the piston;
a groove defined at or near the interior surface of the piston tube in a generally axial direction with respect to the piston axis for allowing the working fluid to pass between a first volume defined at a first side of the piston and a second volume defined at an opposite second side of the piston, wherein the groove has a radial depth, and wherein the radial depth varies along the piston axis; and
an additional groove defined at or near the interior surface of the piston tube in the generally axial direction for allowing the working fluid to pass between the first volume and the second volume, wherein the groove and the additional groove have different axial lengths.

2. The system of claim 1, wherein the first fluidic teeter control assembly is engaged to the shaft.

3. The system of claim 1, wherein the groove has a relative maximum radial depth at or near a midpoint of the piston axis, and smaller radial depths at axial locations spaced from the midpoint of the piston axis.

4. The system of claim 1 and further comprising:
a working fluid thermal condition controller for regulating thermal energy of the working fluid.

5. The system of claim 1 wherein the rotor further comprises a second blade engaged to the shaft by the hub, wherein the second blade has a degree of freedom to pivot relative to the shaft, and wherein a second teeter angle is defined between an instantaneous position of the second blade and a time-averaged plane of rotation of the second blade, the system further comprising:
a second fluidic teeter control assembly engaged between the rotor and the shaft for providing a second dynamic teeter restraining force as a function of the second teeter angle, wherein the second dynamic restraining force is relatively low when the teeter angle is within a first teeter operation range, wherein the second dynamic restraining force is higher when the teeter angle is outside the first teeter operation range, and wherein the first and second dynamic restraining forces are independent from each other.

6. A teeter-controlled wind turbine system comprising:
a support tower extending in a substantially vertical direction;
a shaft supported relative to the support tower;
a rotor for driving the shaft, the rotor comprising:
a central hub;
a first blade engaged to the shaft by the hub, wherein the first blade can pivot relative to the shaft such that a first teeter angle is defined between an instantaneous position of the first blade and a time-averaged plane of rotation of the first blade; and
a second blade engaged to the shaft by a hub, wherein the second blade can pivot relative to the shaft such that a second teeter angle is defined between an instantaneous position of the second blade and a time-averaged plane of rotation of the second blade;
a first fluidic teeter control assembly engaged between the rotor and the nacelle for restraining pivoting motion of the first blade as a function of the first teeter angle such that pivoting motion of the first blade is relatively lightly restrained when the first teeter angle is within a first teeter operation range and pivoting motion of the first blade is restrained more as the first teeter angle moves outside the first teeter operation range; and
a second fluidic teeter control assembly engaged between the rotor and the nacelle for providing a second teeter restraining force as a function of the second teeter angle such that pivoting motion of the second blade is relatively lightly restrained when the second teeter angle is within the first teeter operation range and pivoting motion of the second blade is restrained more as the teeter angle moves outside the first teeter operation range, wherein the first and fluidic teeter control assemblies operate substantially independent from one another, wherein the first and second fluidic teeter control assemblies each comprise:
a piston tube that defines an interior surface;
a piston movable within the piston tube along a piston axis;

a working fluid, wherein the working fluid is displaced as a function of movement of the piston;

a groove located between each piston tube and piston, defined in a generally axial direction with respect to the piston axis, to allow the working fluid to pass between a first volume defined at a first side of the piston and a second volume defined at an opposite second side of the piston; and an additional groove located between each piston tube and piston, defined in the generally axial direction, to allow the working fluid to pass between the first volume and the second volume, wherein the groove and the additional groove have different axial lengths.

7. The system of claim 6, wherein the groove has a radial depth, and wherein the radial depth varies along the piston axis.

8. The system of claim 7, wherein the groove has a relative maximum radial depth at or near a midpoint of the piston axis, and progressively smaller radial depths at increasing axial distances from the midpoint of the piston axis.

9. The system of claim 7, wherein at least three grooves are defined in the interior surface of each piston tube.

10. A method of controlling teeter for a wind turbine having a rotatable shaft and a rotor having at least one blade extending therefrom that can teeter relative to the rotatable shaft, the method comprising:
providing a dynamic teeter restraining force as a function of a teeter angle, wherein the dynamic teeter restraining force is relatively low when the teeter angle is within a first teeter operation range, and wherein the dynamic teeter restraining force is higher when the teeter angle is outside the first teeter operation range; and
controlling the dynamic teeter restraining force solely by non-linearly adjusting fluidic resistance to flow of a working fluid.

11. The method of claim 10 and further comprising:
sensing an azimuthal position of the blade; and
adjusting the restraining force as a function of both the teeter angle and the azimuthal position of the blade.

12. The method of claim 10, wherein the dynamic teeter restraining force is controlled to allow substantially free teetering within the first teeter operation range, the first teeter operation range including a zero degree (0°) teeter angle.

13. The method of claim 12, wherein the first teeter operational range encompasses teeter angles between approximately +3° and −3°.

* * * * *